N. H. SOOY.
TRACTION ENGINE.
APPLICATION FILED JUNE 2, 1919.
1,325,418.
Patented Dec. 16, 1919.
3 SHEETS—SHEET 1.
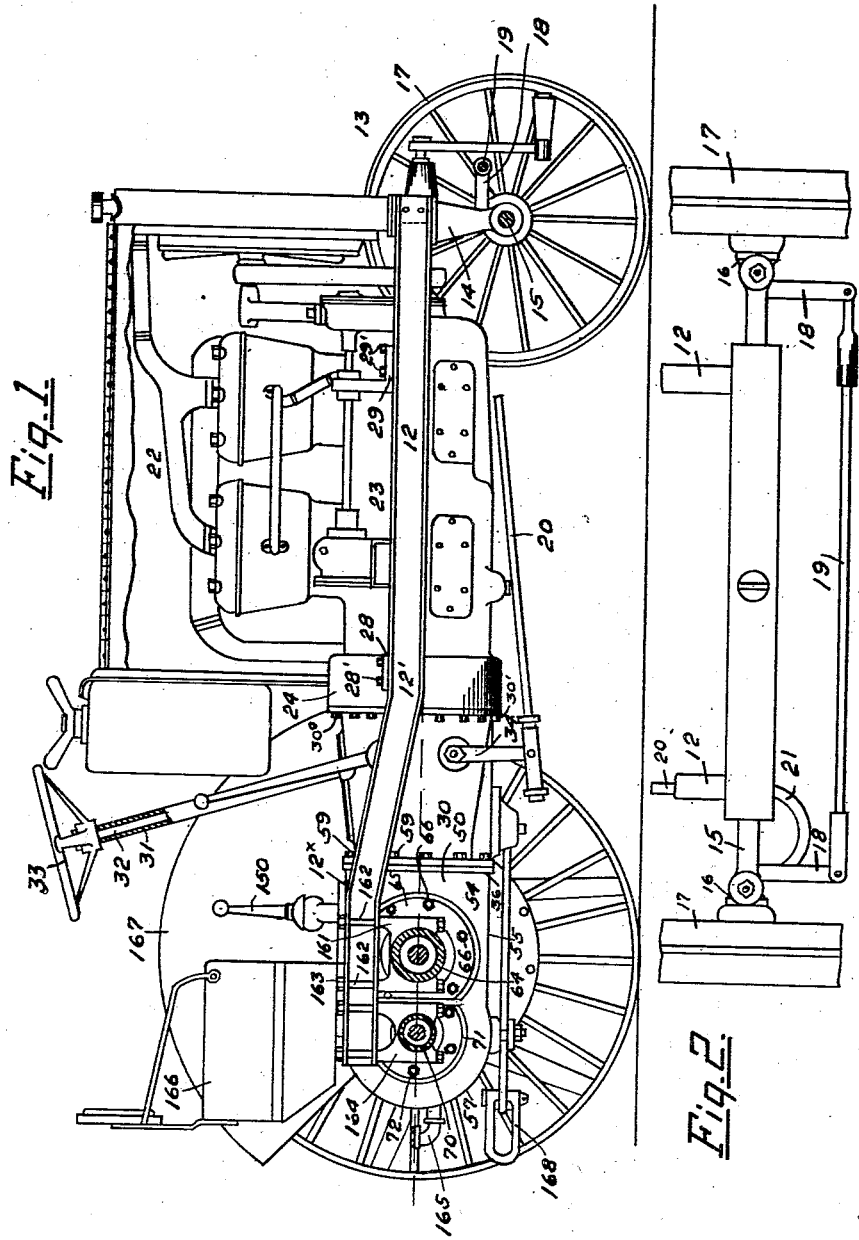
INVENTOR.
Norman H. Sooy
ATTORNEY

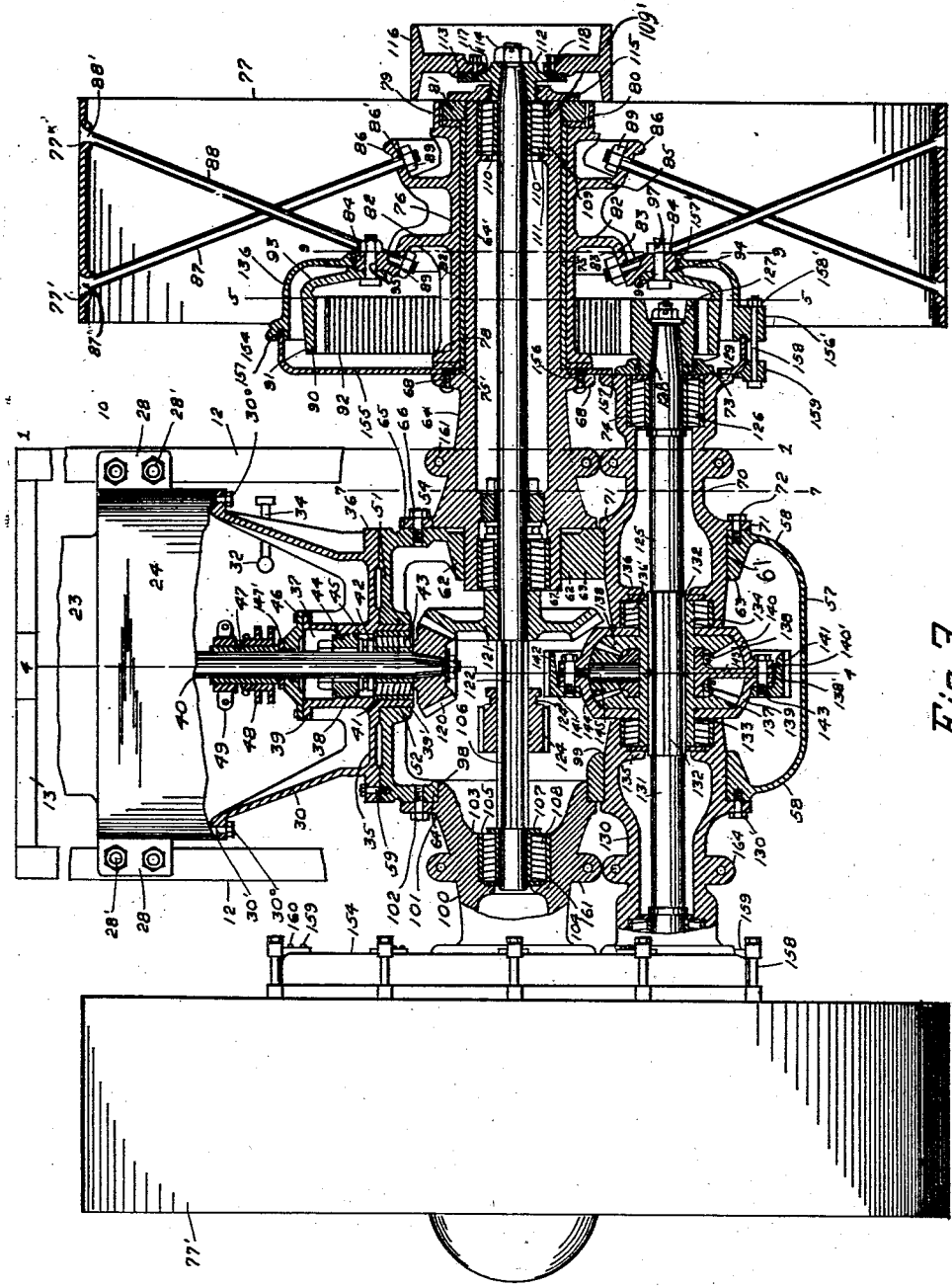

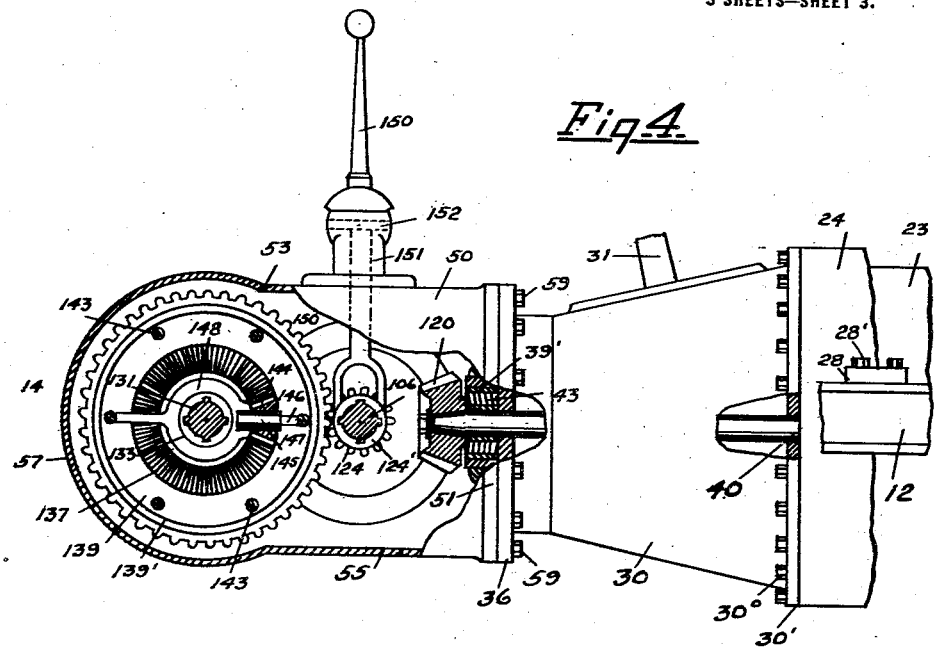
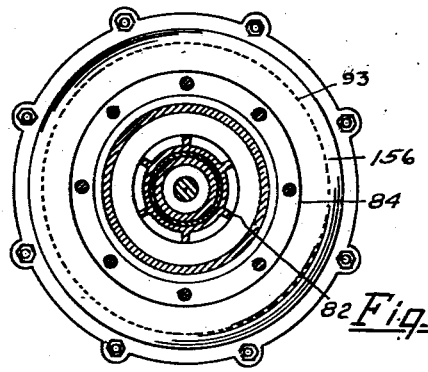
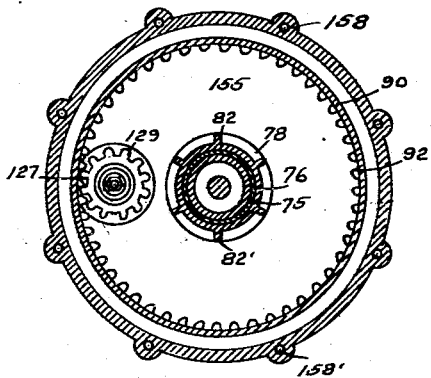
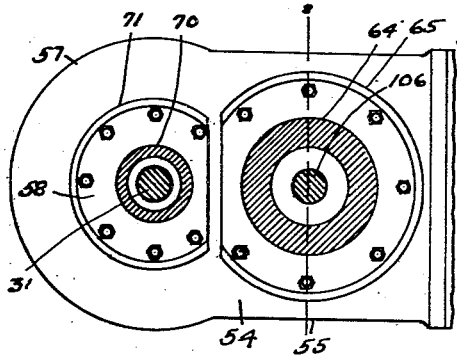
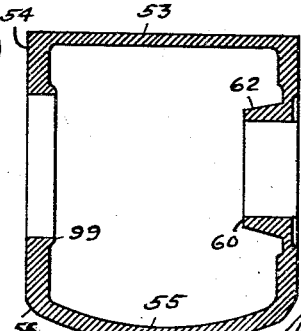

UNITED STATES PATENT OFFICE.

NORMAN H. SOOY, OF KANSAS CITY, MISSOURI.

TRACTION-ENGINE.

1,325,418.   Specification of Letters Patent.   Patented Dec. 16, 1919.

Application filed June 2, 1919. Serial No. 301,138.

*To all whom it may concern:*

Be it known that I, NORMAN H. SOOY, a citizen of the United States of America, residing at Kansas City, in the county of Jackson and State of Missouri, have invented certain new and useful Improvements in Traction-Engines; and I do hereby declare that the following is a full, clear, and exact description of the invention, reference being had to the accompanying drawings, forming a part of this specification.

The objects of the invention are:—

First. In a traction engine to conserve power in power transmission from the motor to the traction wheels, and increase the efficiency of wheel propulsion.

Second. To effect in power transmitting mechanism a double reduction of speed from an actuating rotary shaft to driven rotary shafts within two centers of rotary shaft motion.

Third. To effect the transmission of reduced speed in a train of gears from one rotary shaft to another rotary shaft within the circumference of a motion imparting wheel.

Fourth. To effect the transmission of power to a pulley or band wheel, through the axle of the ground or bull wheel of a traction engine.

Fifth. For conserving power, to obtain a close relation of the differential gear rotary shafts with the source of power.

The invention consists in the novel mechanism and in the construction and combination of the several parts hereinafter fully described and specifically pointed out in the claims.

In the drawings,

Figure 1, is a side view in elevation of the body of the traction engine, with the steering wheel and traction wheel on the right hand side of the chassis removed, the separation being through the forward axle of the steering wheels and the stationary axle for the traction wheel and the housing for the differential shaft and taken on line 1—1 on Fig. 3, and showing the pulley and differential shaft in section.

Fig. 2, is a detail plan view of the forward steering wheels and steering devices.

Fig. 3, is a plan view in horizontal section, taken through the traction wheel on the right hand side of the chassis and extending through the hollow stationary axle or spindle, the lubricating casings supporting the axles and the casings for the differential gear and the internal gear wheel on the traction wheel, showing the main driving shaft of the engine, and the novel mechanism actuated thereby for transmitting power to the traction and pulley wheels through gear reduction.

Fig. 4, is a side view of a portion of the crank shaft case and the housing thereon for the crank shaft bearings, the lubricant holding casing supporting the hollow axles for the bull or ground wheel, and the casing for the differential gear wheels shown in longitudinal vertical section and taken on line 4—4 on Fig. 3, showing the shifting gear on the pulley shaft and a portion of the differential gear, and the gear wheel actuated by the shifting gear.

Fig. 5, is a vertical sectional view, taken through the casing for the internal gear wheel actuating the traction wheel, on line 5—5 on Fig. 3, showing the internal gear wheel and stationary axle, and the parallel pulley shaft and differential shaft and the spur gear wheel on said shaft within the circumference of the internal gear wheel and engaged therewith.

Fig. 6, is a side view of the band or pulley wheel on the pulley shaft; and

Fig. 7, is a detail side view of the case supporting the stationary axles of the traction engine.

Fig. 8, is a transverse sectional view, taken through the forward portion of the casing supporting the hollow sectional axles for the internal gear wheels, and the spur gears on the differential gear axle, taken on line 8—8 on Fig. 7.

Fig. 9, is a face view of the casing for the internal gear wheel, taken from the line 9—9 on Fig. 3.

Similar numerals of reference indicate corresponding parts in all the figures of the drawings.

The body of the traction engine, as illustrated, consists of the chassis or frame 10, the side members 12—12 of the frame being composed of parallel channel beams spaced apart and connected together at their forward ends by the transverse connecting beam 13, see Fig. 3. The channel beams 12—12 extend from the ends of the beam 13 a distance approximately two-thirds the length of said beams in a horizontal line to the point 12' at which point the beams are bent in an upward inclined position, and extended rearwardly a considerable distance to the point 12×, from which point the rear ends of said beams extend in a horizontal line, the flanges of said channel beams extending in an outward direction.

The transverse beam 13 is supported by the bracket 14, upon the forward axle 15 of the traction engine, this axle having the ordinary pivoted extensions 16 upon which are mounted the steering wheels 17. 18 indicates the turning arms for the axle extensions, and 19 the connecting rod connecting the outer end of one arm 18 with the outer end of the other arm 18 for conjoint movement. 20 indicates the wheel operating lever which is curved at 21, at its forward end, and operatively connected with the pivoted extension 16 of the axle 15 on the left hand side of the chassis 10; the steering means shown being substantially the same as in motor propelled vehicles. 22 indicates an internal combustion engine of the ordinary construction, for use upon a traction vehicle, and for the purposes of the invention requires no detail description, and for which any other type of engine may be substituted.

As shown, 23 indicates the crank shaft casing of the engine, which is arranged in position between the forward portions of the channel beams 12—12. At the rear end of the crank shaft case, is a circular neck 24. Upon the side portions of the neck 24, above a line extending diametrically through the neck, are secured the outwardly extended flanges 28, which flanges are bolted to the upper flanges of the respective beams 12—12 by the bolts 28'.

Adjacent the forward end of the crank case, and secured rigidly thereto, are the lateral flanges 29, which flanges are secured by the bolts 29' to said upper flanges of the respective channel beams 12—12.

In rear of the neck 24 of the crank case, is a cone shaped casing 30, having outwardly extended flanges 30' which are bolted by the bolts 30° to the said neck. Secured to the upper portion of the case 30, is the steering column 31, in which is the steering shaft 32, upon the upper end of which is the steering wheel 33. The lower end of the steering shaft extends downwardly with the case 30, as indicated in Fig. 3, and is connected through the well known gearing not necessary to be shown, with the horizontal rotary crank shaft 34, with which the rear end of the steering rod 20 is pivotally connected.

At the forward end of the cone shaped case 30, is an end closing plate 35, and from the outer surface of the said end of the case extends the flange 36 extending around the case.

In the central portion of the end plate 35, is a large circular opening 37. Extending around and integrally connected at its rear end with the sides of said opening, is a cylindrical bearing 38, the forward end of said bearing extending within the case 30 a considerable distance and provided with the flange 39. Upon the outer surface of the end plate 35, and extending around the opening 37, and formed integral with the bearing 38, is a cylindrical bearing 39', which extends rearwardly from the end plate 35 a short distance, its inner circumference being slightly larger than the inner circumference of the casing 38.

40 indicates the driving or rotary crank shaft of the engine, the rear end portion of which shaft extends through the cone shaped casing 30, thence within the cylindrical bearing 39' and a short distance beyond the line of the rear end of said bearing. Within said bearing 39' is a thimble 41, and on shaft 40 is a sleeve 42, between which thimble and sleeve are the common anti-friction rings 43.

44 is an externally screw-threaded nut on shaft 40, which engages with the screw-threaded inner surface of the cylindrical case 38 and whose shaft opening is slightly larger than shaft 40. Between the nut 44 and the bearing rings 43, are washers 45.

46 indicates the head to the case 38, through which shaft 40 extends. Upon shaft 40, forward of the head 46, is a sleeve 47, having a flange 47', the rear flanged end of which sleeve bears against the head 46.

Upon this sleeve 47 is mounted the shifting wheel 48 and collar 49 of the clutch operating mechanism not illustrated and which is of the ordinary construction and effective in all motor vehicles to disengage the power from the speed changing mechanisms.

50 indicates the hermetical case inclosing the gear actuated by the driving shaft for imparting motion to the pulley shaft and the differential gear. This case is provided with a forward end plate 51, having an aperture 52, through which the cylindrical bearing 39' on the rear end plate 35 on the cone shaped case extends; the aperture 52 having a boss on the inner side of the end plate 51 extending around said aperture. As seen in Figs. 1, 4 and 7, the case 50 is practically box shaped in form, having a horizontal top member 53, vertical members 54, and a bottom member 55, curved outwardly and extended upwardly at 56 and forming a union with the side member 54 of the case on the right hand side of the case.

The rear end 57 of the case is curved outwardly in the arc of a circle and the parts connected with the side members 54—54 of the case, curved at 58.

The flange 36 on the rear end of the cone shaped case 30, is made to conform to the end plate 51 of the case 50 and is secured firmly thereto by the tap bolts 59.

In the right hand side member 54 of the case 50, are separate openings 60 and 61, spaced apart, and whose centers are upon the plane of the longitudinal axis of the case. The forward opening 60 is larger in circumference than the opening 61. On the inner surface of the side member 54, and extending around the opening 60, is a boss 62, and extending around the opening 61 is a boss 63, cast integral with the side member of case 50. 64 indicates the stationary axle on the right hand side of the case, which consists of straight casting having a longitudinal opening 64' extending therethrough, and in the end portion of which axle, which is increased in circumference, is an outwardly extended flange 65, secured to the said side member 54 by the screw bolts 66.

The extreme inner end 67 of the axle 64, is reduced in circumference to the size of the opening 60 in the side member 54, of case 50, and extended within the opening 60 past the boss 62.

Upon the axle 64, a short distance outwardly from the portion having flange 65, is a flange 68 extending around the axle.

In the other opening 61, on the side member 54 of the case, is extended past boss 63 the inner end of a hollow stationary shaft bearing 70, having the circular flange 71 which comes into contact with the outer surface of said side member and secured thereto by the screw bolts 72.

The outer portion of the shaft bearing 70, extends outwardly approximately one-third the distance from the case 50 in which the hollow axle 64 extends, and is provided with an outwardly extended flange 73 at its outer end.

Within the outer end portion of the said shaft bearing 70, is an annular recess 74.

Upon the stationary axle 64, outwardly from flange 68, is an axle friction bushing 75, the inner portion 75' of which bushing is bent outwardly and opposite to the flange 68. Upon this bushing 75 is mounted the rotatable hub 76 of the traction or bull wheel 77 of the traction engine. The inner end of the hub is provided with an outwardly extended flange 78 which bears against the flanged portion 75' of the bushing 75. The outer end of the hub 76 is increased in circumference at 79 and provided with a circular recess 80 in which recess is the outwardly extended outer end of bearing 75 and the washer 81.

Upon the hub 76 and forming an integral part thereof, is an outwardly extended flange plate 82, see Fig. 9, located approximately between the ends of said hub 76, having an inwardly bent outer portion 83, and integral therewith, an outwardly extended portion 84 of slightly increased thickness. Upon hub 76, between the flange portion 82 and the outer end of said hub is a flange portion 85 integral with the hub and having an outwardly bent outer portion 86.

In the peripheral portion of the bull wheel 77, are reamed openings 77', 77ˣ spaced apart from each other and in the direction of the circumference of the said wheel. In these openings are secured the heads 87', 88' of the respective rods or spokes 87 and 88, which extend inwardly past each other toward the respective bent portions 86 and 83 of the flanged portion of the plates 85 and 82 on hub 76, and through openings 86', 83', in said flanges. The inner end portions of these rods are screw-threaded and provided with the nuts 89. The flanges 82 and 85 on the hub 76, are braced by radial ribs 82', integral with the hub and connecting one flange with another. See Fig. 5.

90 indicates the cylindrical internal gear wheel, which imparts rotary motion to the traction wheel 77, 77', and which is concentric to the hub 76. This wheel is approximately one-half the circumference of the wheel 77, and composed of the external circular plate or wheel 91 provided with internal gear teeth 92. With the outer circumferential portion of the plate 91 is connected integrally the supporting circular plate 93 (seen in dotted lines in Fig. 9) which extends inwardly at an obtuse angle to plate 91, the inner circular portion of which plate is provided with a rabbet 94 and fitted to the inner surface of the thickened portion 84 of the circular bent flange 83, on the hub 76, through which thickened portion of the plate and the inner circular portion of the plate 93 extend the bolt openings 95. Bolts 96 extend through said openings 95 upon which are the securing nuts 97.

In the left hand side of the case 50 are transverse openings 98 and 99, opposite the openings 60 and 61 in the right hand side of the case, the opening 98 being approximately one-third larger in circumference than the opening 60. The stationary hollow axle 100, on the left hand side of the case 50, is similar in construction to the stationary axle 64, the bull wheel 77' being the same as bull wheel 77 and mounted to rotate with a hub in precisely the same manner as the wheel 77 with the hub 76 and provided with an internal gear wheel precisely the same as the internal gear wheel 90.

The inner end of the stationary axle 100 is provided with a radial flange 101, which is secured to the side member of the case 50 by the screw bolts 102.

Within the said enlarged portion of the hollow axle 100, is a circular inward extension 103 of the inner surface of said axle, in which is a recess 104 in which recess is a circular case 105.

106 indicates a rotary power transmitting pulley shaft, one end of which shaft extends within the case 105 and is provided with a flanged sleeve 107, and between said sleeve and the case 105, are the anti-friction rings 108 commonly employed and within which said shaft is journaled. The other end of the pulley shaft extends within the inner end of the stationary axle 64 and is supported by an anti-friction central shaft bearing in said end precisely the same as the bearing for the driving shaft 40 in the case 43, in the bearing 39', and provided with like anti-friction rings and retaining devices as seen at 44 and 45. The pulley shaft extends from said antifriction central bearing to the outer end of the hollow axle upon the inner surface of which is a recess 109, in which recess is a case 109'. Upon the shaft 106, is a sleeve 110, and between said sleeve 110 and case 109, are anti-friction shaft bearings 111.

The outer end of shaft 106, extends outwardly a short distance from the line of the outer end of the hub 76 and is tapered in a slight degree. Upon said end of the shaft is mounted a hub 112 from which hub extends a circular flange 113. The extreme end of the shaft 106 is screw-threaded and provided with a nut 114 securing said hub 112 removably on the shaft. 115 indicates a collar on the hub 112, which bears against the washer 81 in the recess 80 in the outer end of the hub 76.

116 indicates a removable flanged power transmitting band wheel having a central opening 117 in its web, larger in circumference than said hub and which web is removably secured to the flange 113 on the hub 112, by the bolts and nuts 118. See Fig. 6.

Upon the inner end of the driving shaft 40, is mounted fixedly a beveled gear wheel or pinion 120, small in circumference and on the pulley shaft 106 is mounted to rotate with said shaft, a beveled gear wheel 121, approximately twice the circumference of the beveled gear wheel 120, the teeth of which gear wheels 120 and 121 are in constant mesh with each other. The portion of shaft 106 from the gear wheel 121 toward its inner end is provided with splines 122 and upon said splined portion of the shaft is a sliding pinion 124, having a grooved collar 124'.

125 indicates the sectional differential gear shaft journaled within the hollow shaft bearing 70 on the right hand side of the case 50 in the outer end of which bearing, in the recess 74, are anti-friction bearings 126, which are precisely the same as the bearings 110 and 111, for the outer end of the pulley shaft 106. The said outer end of the differential gear shaft 125 extends a short distance past the line of the outer end of casing 70 and is tapered toward said end. Upon said end of the sectional shaft 125 is fixedly mounted a pinion 127, which is in mesh with the teeth 92 of the internal gear wheel 90. Upon the pinion 127, is a hub 128, and mounted on said hub is a collar 129, which bears on the outer end of the shaft bearing 70.

130 indicates the other hollow shaft bearing for the other sectional differential shaft 131, on the left hand side of case 50, which is precisely the same as the shaft bearing 70 on the right hand side of the case 50 and secured thereto by screw bolts 130', the inner end of which shaft bearing extends within the opening 99 in the side member 54, and upon the outer end is a like pinion not shown. The inner end portions of the separate differential shafts 125—131 are provided with splines 132, and mounted thereon are the separate hubs 133 and 134 respectively. On the inner surface of the respective shaft bearings 130 and 70, are inwardly extending lugs 135 and 136 respectively, which retain the hubs in position on the respective shafts 131 and 125, and are recessed to receive the anti-friction bearings 136' on the separate hubs 133 and 134. On the respective hubs 133 and 134, are the respective beveled gear wheels 137—138. 139 and 140 are separate parts of the case or housing for the gear wheels 137—138 having flanges 138' 140', the sides of which case are rotatably mounted on the respective hubs 133—134 and also guided by the inner ends of the shaft bearings 70 and 130.

141 indicates a gear wheel larger in circumference than the split housing for the gear wheels 137 and 138, having an inner circumferential flange 142 which is secured to the flanges on both parts 139 and 140 of the housing by the bolts 143. A beveled gear pinion 144 is mounted on a stud shaft 145 and meshes with the respective beveled gear wheels 137 and 138. The stud shaft has an outer end portion reduced in circumference, (see Fig. 4), at 146, which is seated within an opening 147 extending within the separate flanges 138' 140' of the housing, the inner end of which stud shaft is seated within an opening in the sectional hubs 148—148' on the inner ends of the hubs 133 and 134 respectively. The pinion 124 is moved on the pulley shaft 106 in and out of engagement with the gear wheel 141 on the housing for the differential gear, by means of the forked inner end of a pivoted lever 150, which forked ends engage with the grooved neck 124', on the said gear wheel 124. See Fig. 4.

This lever 150 extends upwardly within the hollow standard 151, on the top member 53 of the case 50, and is pivoted thereto at 152.

The respective internal gear wheels 90 and the spur gear wheels or pinions on the outer ends of the differential shafts, are inclosed respectively by a case 154 of similar construction. This case consists of a circular inner plate 155 larger in circumference than the internal gear wheel 90. In this plate are two openings, one opening 156 being slightly larger than the outer circumference of the hub 76. The inner concentric part of said plate having said opening extends between the flange 75' of the bushing 75 and the flange 68 on the axle 64 and is riveted to said flange. The other opening 157, in said plate, is slightly larger than the circumference of the collar 129 on the hub 128 of the pinion 127, the plate 155 coming into close contact with the outer end of the hollow shaft bearing 70 for the differential shaft, as seen in Fig 3. The outer portion of the inner plate 155 is bent at right angles and extended outwardly and within the annular groove in the thickened circular face 156' of the separate outer member 136, which is extended outwardly and thence bent at right angles and brought into frictional contact with the outer face of the thickened extension 84 of the bent portion 83 of the flange 82 on the hub 76, between which portions of the plate 136 and the extension 84, is a packing 157'.

The separate parts 155 and 136 of the case 154, are retained together by the screw-threaded bolts 158, the ends of which pass through the thickened face portion 156' of the outer plate of case 154 and are provided with nuts 158'. Between the head of the bolt and said thickened extension 156' are clamping blocks 159, which clamps upon the outer surface of the inner plate 155 of the case 154 to which the clamping blocks are secured by the nuts 160. See Fig. 3.

The rear end members of the channel beams 12, with which the crank case 23 of the engine is connected, are supported upon the axles 64 and 100 on the case 50, by means of the brackets 161 which are connected with said beams by the screw bolts 162 which extend upwardly through the flanges of the channel beams 12—12 and are provided with the securing nuts 163. With the respective bearings 70 and 130, for the differential shafts, are connected similar brackets 164, which are secured to the channel beams 12—12 in precisely the same manner as the brackets 161 to the said channel beams.

The hermetical case 50 is supplied with lubricating oil through the supply pipe 165 (see Fig. 1) and the case 154 for the internal gear wheel, which is also hermetical, may be supplied with lubricating oil in like manner, the gear being thus self-lubricated and prevented from oxidation.

A seat 166 is provided for the operator and a dust shield 167 extended over the traction wheel.

In operation of the traction engine for traction purposes, the pivoted operating lever 150 is moved laterally in position, thereby causing the forked portion on said lever to move the pinion 124 on the rotatable pulley shaft 106 in the direction of the bevel gear wheel 121, and into engagement with the large gear wheel 141 on the housing for the differential gear wheels 137 and 138 on the alined differential shafts 125 and 131 and the beveled gear pinion 144.

Motion being imparted to the driving shaft 40 from the engine, rotary motion is imparted at high speed from the beveled gear pinion 120, to the beveled gear wheel 121, on the pulley shaft 106 and thence through the pinion 124 on said pulley shaft to the large gear wheel 141, on the housing, and thence through the beveled pinion 144, to the beveled wheels 137 and 138 on the separate hubs 133 and 134 and rotary motion imparted to the differential gear shafts 125 and 131 equally until a differential movement is caused in an accelerated movement of either one of said shafts in changing the direction of movement of the traction engine, in which event the pinion 144 permits one of the beveled gear wheels 137 to move in an opposite direction of movement to the gear wheel 138. Rotary motion thus imparted to the differential shafts 125 and 131 is transmitted through the pinions 127 on said shafts to the internal gear wheels 90 and a reduced speed imparted to said gear wheels, and which motion is imparted to the traction wheels 77—77' the fixed part of the casing 155 remaining stationary while the flanged plate 82 rotates with the hub 76 of each traction wheel independently of the outer portion 136 of said case at the point having packing 157'.

The traction engine which is furnished with the ordinary drag bar 168, for attachment of a plow or other farm implement thereto, is directed by the operator from his seat 166 and the wheel 33 operated to move the lever 34 connected with the rod 20 leading to the movable parts of the forward axle 15, and the steering wheels 17 are moved in the direction of movement of the traction engine, as is desired.

When the traction engine is no longer employed for traction purposes, the lever 150 is operated to throw the pinion 124 on the pulley shaft out of engagement with the gear wheel 141 on the housing for the differential gear, and rotary motion from the engine transmitted directly to the pulley shaft 106 and imparting rotary motion to the band wheel 116. The usual belt upon a threshing machine may be extended over the band wheel and the power of the engine employed for threshing purposes or the power transmitted to any other machine by any well known power transmitting devices. The advantage of the pulley shaft and the band wheel is such that the band wheel may be of any size commensurate with the traction wheels and the position of the band wheel, more convenient for transmitting power. During the operation of the traction engine as such, the band wheel may be removed, and when power is required for other purposes, the efficiency of a stationary engine is available.

The mechanism employed for imparting rotation to the traction wheels consists of a single rotary shaft carrying the power from the driving shaft to the differential shafts, the speed being changed through the gear wheel 141 on the housing for the differential gear mechanism, and still further changed in its transmission through the internal gear wheels 90; hence from two centers of rotary shaft motion, a double reduction of speed is effected, and an economy of power in eliminating an intervening rotary shaft in the usual double train of gears.

The further advantage of the mechanism is to assemble the power transmitting parts closer to the source of power and reduce frictional loss and loss of power in power transmission through the elimination of one shaft ordinarily used in double gear reduction.

Such modifications may be employed as are within the scope of the appended claims.

Having fully described my invention, what I now claim as new and desire to secure by Letters Patent, is:—

1. In a train of gears, the combination with the source of power of a power transmitting rotary shaft, a hollow stationary axle within which said shaft is journaled, and a rotatable hub thereon, a driving wheel having an internal gear mounted on the said hub, and a separate rotary shaft extending within the circumference of said internal gear wheel, speed changing devices on said power transmitting and separate shafts and a pinion on said separate shaft engaging with the internal gear on said driving wheel.

2. In a train of gears the combination with the source of power of a power transmitting rotary shaft, a hollow non-rotatable axle within which said shaft is journaled, a rotatable hub on said non-rotatable axle, a cylindrical driving wheel having internal gear teeth supported upon said hub and rotatable therewith, and a separate rotary shaft extending within the path of movement of the gear teeth on said driving wheel and a pinion thereon meshing with said teeth and means for transmitting motion at reduced speed from one of said shafts to the other.

3. In speed reducing mechanism, the combination with the main driving rotary shaft, of a power transmitting rotary shaft and beveled gear wheels on said shafts in operative engagement, a non-rotatable hollow axle supporting said power transmitting shaft and a rotatable hub thereon, a driven wheel having internal gear teeth supported by said hub, a separate driven shaft and a pinion thereon in the path of the gear teeth on said internal gear wheel and a separate gear wheel on said shaft and a speed reducing gear wheel on the power transmitting shaft having the beveled gear wheel in engagement with the separate gear wheel on the separate driven shaft.

4. In a traction engine, the combination with the stationary hollow axles upon which the traction wheels are rotatably mounted and with the driving shaft of the engine of a power transmitting rotary shaft journaled in said hollow axle, a power transmitting wheel upon the outer end of said shaft and means for transmitting rotary motion from said shaft thereto or to the traction wheels.

5. In a traction engine, the combination with the stationary hollow axles and with the traction wheels having hubs rotatably mounted on said axles and with the driving shaft of the engine, of a power transmitting rotary shaft journaled in said hollow axles, and a power transmitting wheel on the outer end of said shaft, speed changing devices on said shaft and the driving shaft of the engine in engagement, and separate speed imparting and power transmitting devices on said shaft imparting rotary motion to the traction wheels.

6. In a traction engine, the combination with the stationary hollow axles, and with the traction wheels having rotatable hubs mounted on said axles, and with driving wheels mounted on said hubs having internal gear teeth, of independent differential shafts and gears on said shafts in the path of movement of the teeth on said internal gear wheels, a power transmitting rotary shaft journaled in said hollow axles and gear on said shaft and the driving shaft of the engine engaging with each other, and power transmitting means on said shaft for transmitting rotary motion to the differential shafts.

7. In a traction engine, the combination with the stationary hollow axles, and with the traction wheels having rotatable hubs mounted on said axles, and with driving wheels mounted on said hubs having internal gear teeth, and with independent differential shafts and differential gear controlling said independent shafts, and with gears on said shafts in the path of movement of the gear teeth on the internal gear wheels, of a power transmitting rotary shaft journaled within said hollow axles, a power transmitting wheel on the outer end of said shaft, and power transmitting devices on said shaft actuating the differential gear on the differential shafts.

8. In a traction engine, the combination with the engine and its driving shaft, and with a power transmitting rotary shaft and differential shafts and gearing on said shafts transmitting rotary motion from said shaft to the differential shafts, and with a case for said gearing of stationary hollow axles for said power transmitting rotary shaft, bearings for said differential shafts connected with said case, traction wheels having hubs rotatably mounted on said stationary axles and driving wheels therefor, having internal gear teeth mounted upon and rotating with said hubs, and pinions on said differential shafts in the path of movement of the internal gear teeth on said driving wheels, and differential mechanism connecting the differential shafts.

9. In a traction engine, the combination with the engine and its driving shaft, and with parallel rotary power transmitting and differential rotary shafts and differential gearing on said shafts, a rotatable housing for said gearing, a gear wheel mounted on said housing, and a gear on said power transmitting shaft engaging with the gear wheel on said housing, a case for said parallel shafts and gearing, stationary hollow axles and shaft bearings on said case within which said power transmitting rotary shaft and said differential shafts are journaled respectively, traction wheels having hubs rotatably mounted on said axles, driving wheels for the traction wheels having internal gear teeth mounted on said hubs and pinions on the differential shafts in the path of movement of, and engaging with the gear teeth on the said internal gear driving wheels.

NORMAN H. SOOY.

Witnesses:
 MARGUERITE BROWDER,
 ROBERT O. McLIN.